(12) United States Patent
Novakovic et al.

(10) Patent No.: US 11,403,141 B2
(45) Date of Patent: Aug. 2, 2022

(54) HARVESTING UNUSED RESOURCES IN A DISTRIBUTED COMPUTING SYSTEM

(71) Applicant: Microsoft Technology Licensing, LLC, Redmond, WA (US)

(72) Inventors: Stanko Novakovic, Seattle, WA (US); Íñigo Goiri Presa, Redmond, WA (US); Sameh Elnikety, Redmond, WA (US); Ricardo G. Bianchini, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 16/865,865

(22) Filed: May 4, 2020

(65) Prior Publication Data

US 2021/0342188 A1    Nov. 4, 2021

(51) Int. Cl.
*G06F 9/46* (2006.01)
*G06F 9/50* (2006.01)
*G06F 9/455* (2018.01)
*G06F 12/10* (2016.01)

(52) U.S. Cl.
CPC ........ *G06F 9/5005* (2013.01); *G06F 9/45558* (2013.01); *G06F 12/10* (2013.01)

(58) Field of Classification Search
CPC ..... G06F 9/5005; G06F 9/45558; G06F 12/10
See application file for complete search history.

(56) References Cited

U.S. PATENT DOCUMENTS 8,930,731 B2    1/2015  Agneeswaran et al.
9,130,844 B1    9/2015  Malik et al.
10,542,085 B2   1/2020  Bianchini et al.
2013/0067193 A1 3/2013  Kagan et al.
2016/0011896 A1 1/2016  Khalid
(Continued)

FOREIGN PATENT DOCUMENTS

WO    2007016657 A2    2/2007

OTHER PUBLICATIONS

"International Search Report and Written Opinion Issued in PCT Application No. PCT/US2021/026501", dated Jul. 21, 2021, 11 Pages.

(Continued)

*Primary Examiner* — Wissam Rashid
(74) *Attorney, Agent, or Firm* — Ranjeev Singh; Singh Law, PLLC

(57) ABSTRACT

Systems and methods related to harvesting of the unused resources in a distributed computing system are described. An example method, in a system including a host server, having a first instruction set architecture (ISA), and an interface card, having a second ISA is provided. The method includes designating at least one type of resource, associated with the host server for harvesting by compute entities configured for execution using the processor having the second ISA, where the host server is configured to execute compute entities requiring execution by the processor having the first ISA. The method further includes in response to a request for accessing the at least one type of resource by a compute entity, executing on the processor having the second ISA, automatically allowing the compute entity to access the at least one type of resource associated with the host server.

20 Claims, 7 Drawing Sheets

(56) References Cited

U.S. PATENT DOCUMENTS

| | | | |
|---|---|---|---|
| 2017/0102971 A1* | 4/2017 | Blagodurov | .......... G06F 9/5038 |
| 2019/0372898 A1 | 12/2019 | Mishra et al. | |
| 2020/0097310 A1 | 3/2020 | Shukla et al. | |
| 2020/0104275 A1 | 4/2020 | Sen et al. | |

OTHER PUBLICATIONS

"Amazon EC2 A1 Instances", Retrieved from: https://web.archive.org/web/20181129113317/https:/aws.amazon.com/ec2/instance-types/a1/, Nov. 29, 2018, 7 Pages.

"Amazon EC2 A1 Instances Are Now Available in Additional Regions", Retrieved from: https://aws.amazon.com/about-aws/whats-new/2019/08/amazon-ec2-a1-instances-are-now-available-in-additional-regions/, Aug. 28, 2019, 3 Pages.

"R281-T94 (rev. 100)", Retrieved from: https://www.gigabyte.com/us/ARM-Server/R281-T94-rev-100/sp#sp, Retrieved Date: Oct. 28, 2019, 8 Pages.

Barr, Jeff, "New—EC2 Instances (A1) Powered by Arm-Based AWS Graviton Processors", Retrieved from: https://aws.amazon.com/blogs/aws/new-ec2-instances-a1-powered-by-arm-based-aws-graviton-processors/, Nov. 26, 2018, 6 Pages.

Epping, Duncan, "VMworld Reveals: Armed and Ready (ESXi on ARM, #OCTO2944BU)", Retrieved from: http://www.yellow-bricks.com/2019/09/09/vmworld-reveals-armed-and-ready-esxi-on-arm-octo2944bu/, Sep. 9, 2019, 9 Pages.

Gupta, et al., "To Infinity and Beyond: Time-Warped Network Emulation", In Proceedings of 3rd Symposium on Networked Systems Design and Implementation, May 8, 2006, 14 Pages.

Hao, et al., "LeapIO: Efficient and Portable Virtual NVMe Storage on ARM SoCs", In Proceedings of the Twenty-Fifth International Conference on Architectural Support for Programming Languages and Operating Systems, Mar. 16, 2020, 15 Pages.

Liu, et al., "E3: Energy-Efficient Microservices on SmartNIC-Accelerated Servers", In Proceedings of USENIX Annual Technical Conference, Jun. 10, 2019, pp. 363-378.

Morgan, Timothy Prickett, "Finally: AWS Gives Servers A Real Shot in the Arm", Retrieved from: https://www.nextplatform.com/2019/12/03/finally-aws-gives-servers-a-real-shot-in-the-arm/, Dec. 3, 2019, 12 Pages.

Svanfeldt-Winter, et al., "Cost and Energy Reduction Evaluation for ARM Based Web Servers", In Proceedings of IEEE Ninth International Conference on Dependable, Autonomic and Secure Computing, Dec. 12, 2011, pp. 480-487.

Vicinanza, Stephen, "Amazon Unveils EC2 A1 Arm Bare Metal Instances", Retrieved from: https://www.cnx-software.com/2019/10/17/amazon-ec2-a1-arm-bare-metal-instances/, Oct. 17, 2019, 9 Pages.

Zang, et al., "PROP: Using PCIe-based RDMA to Accelerate Rack-Scale Communications in Data Centers," In Proceedings of 2015 IEEE 21st International Conference on Parallel and Distributed Systems, 8 pages.

Kong, Kwok, "Use of Non-transparent Bridging with IDT PCI Express PCIe Gen1 NTB Switches," Retrieved from https://www.idt.com/us/en/document/apn/724-non-transparent-bridging-idt-pes32nt24g2-pcie-switch, Retrieved on Apr. 18, 2020, 20 pages.

Kong, Kwok, "Non-transparent Bridging with IDT 89HPES32NT24G2 PCI Express NTB Switch," Retrieved from https://www.idt.com/us/en/document/apn/510-use-non-transpared-bridging-idt-pci-express-ntb-gen1-switches; Retrieved on: Apr. 19, 2020, 28 pages.

Regula, Jack, "Using Non-transparent Bridging in PCI Express Systems," Retrieved from: https://docs.broadcom.com/doc/12353428, Retrieved on: Apr. 1, 2020, 31 pages.

"Stingray PS225 2x25-Gb High-Performance Data Center SmartNIC," Retrieved from: https://docs.broadcom.com/doc/PS225-PB; Retrieved on: Mar. 31, 2020, 2 pages.

"Stingray PS1100R Fully Integrated 100GbE Fabric-Attached Storage Adapter," Retrieved from: https://docs.broadcom.com/doc/PS1100R-PB; Retrieved on: Apr. 1, 2020, 2 pages.

* cited by examiner

HARVESTING UNUSED RESOURCES IN A DISTRIBUTED COMPUTING SYSTEM

BACKGROUND

Increasingly, computing, storage, and network resources are accessed via the public cloud, private cloud, or a hybrid of the two. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Cloud service providers offer access to these resources by offering cloud computing and storage resources to customers.

There is a need for methods and systems to allow harvesting of resources in distributed computing systems, including cloud computing systems.

SUMMARY

In one aspect of the present disclosure relates to a method in a system including at least one host server and at least one interface card configured to interface with a network or a storage, where the at least one host server comprises a processor having a first instruction set architecture (ISA) and the at least one interface card comprises a processor having a second ISA. The method may include designating at least one type of resource, associated with the at least one host server for harvesting by compute entities configured for execution using the processor having the second ISA, where the at least one host server is configured to execute compute entities requiring execution by the processor having the first ISA. The method may further include in response to a request for accessing the at least one type of resource by a compute entity, executing on the processor having the second ISA, automatically allowing the compute entity to access the at least one type of resource associated with the at least one host server.

In another aspect, the present disclosure relates to a method in a system including at least one host server and at least one interface card configured to interface with a network or a storage, where the at least one host server comprises a processor having a first instruction set architecture (ISA) and the at least one interface card comprises a processor having a second ISA. The method may include the at least one host server designating at least one type of resource, associated with the at least one host server for harvesting by compute entities configured for execution using the processor having the second ISA, where the host server is configured to execute virtual machines requiring execution by the processor having the first ISA, and where the at least one type of resource may include at least one of a host memory and an I/O device. The method may further include a first hypervisor associated with the at least one host server sharing control information with a second hypervisor associated with the at least one interface card to enable access to the portion of the host memory and the portion of the I/O device. The method may further include in response to a request for accessing the at least one type of resource by a compute entity, executing on the processor having the second ISA, automatically allowing the compute entity to access the at least one type of resource associated with the at least one host server.

In yet another aspect, the present disclosure relates to a distributed computing system including a host server comprising a processor having a first instruction set architecture (ISA), where the host server is configured to service compute entities corresponding to at least one tenant, and where each of the compute entities is required to execute using the processor having the first ISA. The distributed computing system may further include an interface card, coupled to the host server, comprising a processor having a second ISA. The distributed computing system may further include a system configured to: (1) allow designation of at least one type of resource, associated with the host server for harvesting by compute entities configured for execution using the processor having the second ISA, (2) allow sharing of control information between a first hypervisor associated with the host server and a second hypervisor with the interface card, and (3) in response to a request for accessing the at least one type of resource by a compute entity, executing on the processor having the second ISA, automatically allow the compute entity to access the at least one type of resource associated with the at least one host server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to enabling the harvesting of unused resources in a distributed computing system. Certain examples relate to the harvesting of resources designated by a host server in a cloud computing environment. Additional examples relate to harvesting resources of a host server, designated by the host server as unallocated resources, to which an interface card, such as a smart network interface card (smartNIC) is attached. The harvesting of the unallocated resources may allow the use of smartNIC, or smartNIC-like devices, to offer virtual machines (VMs), containers, micro-VMs, microservices, unikernels for serverless functions, or other similar functionality. The host server may be any server in a cloud computing environment that is configured to serve tenants or other subscribers of the cloud computing service. In certain examples, the host server may include x86 processors and the smartNIC may include an ARM® system-on-chip (SoC). The resources that can be harvested may include memory/storage resources, networking resources, and power/cooling resources. Thus, in some scenarios, instead of deploying new ARM®based servers, the ARM®-based smartNIC may operate as an ARM®-based server that can harvest resources from the x86-based host servers.

Figure 1:
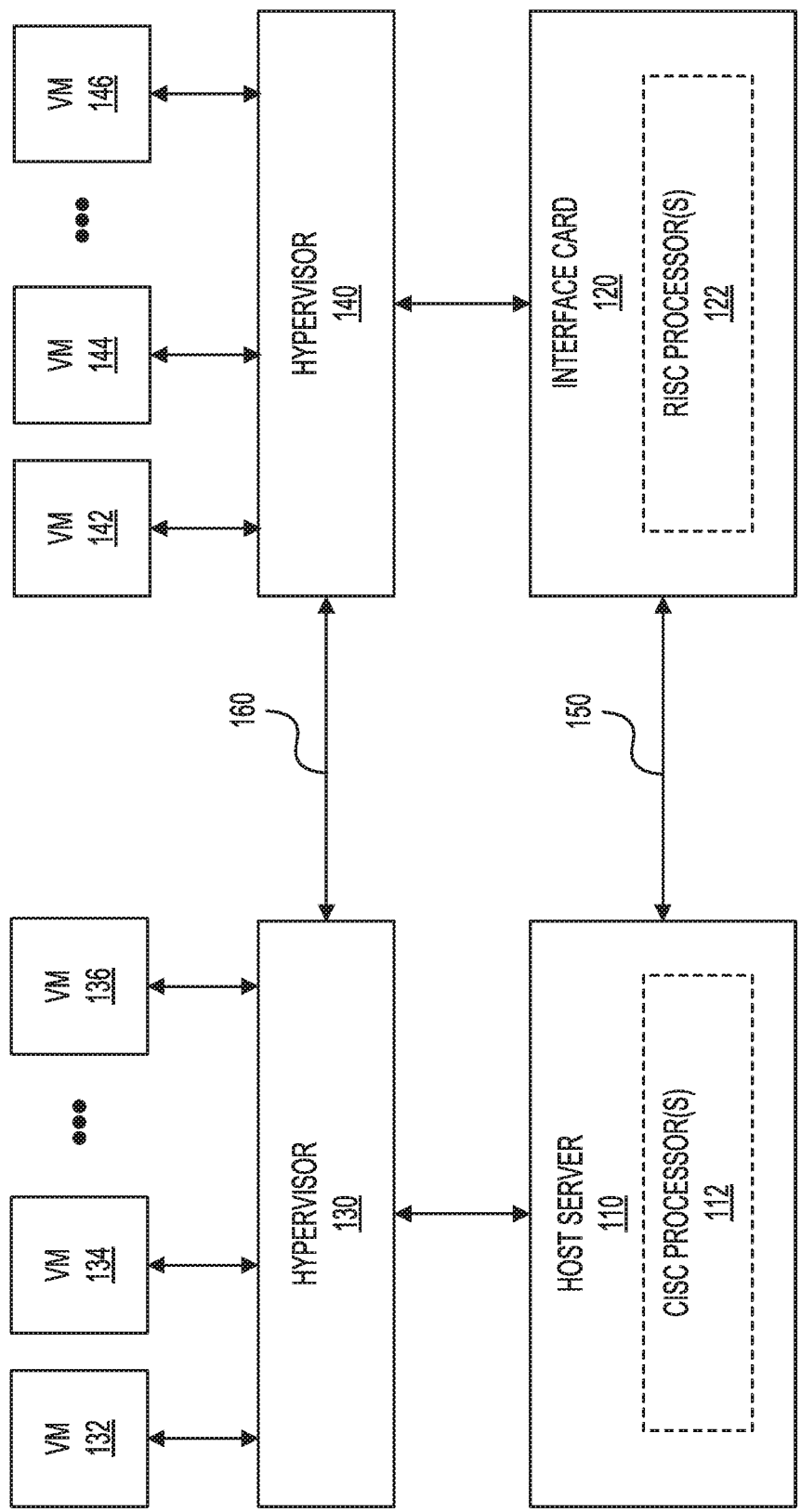
FIG. 1 shows a system for harvesting unused resources in accordance with one example.

FIG. 1 shows a system 100 for harvesting unused resources in accordance with one example. System 100 may include a host server 110 coupled via a bus 150 to an interface card 120. System 100 may be implemented as a server or a rack of servers, such that host server 110 and interface card 120 may be installed in the same rack or a similar structure. In one example, bus 150 may correspond to the Peripheral Interconnect Express (PCI Express) bus. Host server 110 may include one or more processors having an instruction set architecture (ISA). The processors may be configured to provide at least some form of compute functionality. As an example, host server 110 may include CISC processor(s) 112 that correspond to a complex instruction set computer (CISC) type of ISA. Example CISC processors may include x86 processors or the like. Interface card 120 may be configured to primarily provide a networking or storage functionality to host server 110. In this example, interface card 120 may include RISC processor(s) 122 that correspond to a reduced instruction set computer (RISC) type of ISA. Example RISC processors 122 may include ARM®-based processors.

With continued reference to FIG. 1, host server 110 may be configured to execute instructions corresponding to hypervisor 130. Hypervisor 130 may further be configured to interface with virtual machines (VMs) (e.g., VM 132, 134, and VM 136). Instructions corresponding to the VMs may be executed using any of CISC processor(s) 112. Interface card 120 may be configured to execute instructions corresponding to hypervisor 140. Hypervisor 140 may further be configured to interface with virtual machines (VMs) (e.g., VM 142, 144, and VM 146). Instructions corresponding to the VMs may be executed using any of RISC processor(s) 122. Host server 110 may be coupled via a bus system 150 to interface card 120. Hypervisor 130 may share control information with hypervisor 140 via control path 160. Control path 160 may correspond to a path enabled via bus system 150 or another bus system (not shown). Each of hypervisor 130 and hypervisor 140 may be a kernel-based virtual machine (KVM) hypervisor, a Hyper-V hypervisor, or another type of hypervisor. Although FIG. 1 shows system 100 as including a certain number of components arranged and coupled in a certain way, it may include fewer or additional components arranged and coupled differently. In addition, the functionality associated with system 100 may be distributed or combined, as needed. Moreover, although FIG. 1 describes the access to the unused resources by VMs, other types of compute entities, such as containers, micro-VMs, microservices, unikernels for serverless functions, may access the unused resources associated with the host server in a like manner. As used herein, the term "compute entity" encompasses, but is not limited to, any executable code (in the form of hardware, firmware, software, or in any combination of the foregoing) that implements a functionality, an application, a service, a microservice, a container, a unikernel for serverless computing, or a part of the aforementioned.

In certain examples of the present disclosure, to harvest unused resources from the host server, the operating system (or hypervisor) running on the ARM®-based server (e.g., host server 110) would have to cooperate with the operating system running on the host server. As an example, the operating system or the hypervisor may cooperate with the host server to be able to borrow unused memory and disk space. In this example, the control path (e.g., control path 160) would require involvement from both parties at the OS/hypervisor level. Once the resources have been assigned to the ARM®-based interface card, the compute entities (e.g., virtual machines) running on the ARM®-based interface card may access the resources made available by the host server using load/store instructions or remote direct memory access (RDMA), depending on the capabilities of the card. In certain examples, both the storage resource and the network resources can be accessed using peer to peer (P2P) functionality, which may be implemented as part of certain interface cards.

With respect to the harvesting of the unused memory (e.g., DRAM) associated with the host server, at a broad level, there may be two ways for a compute entity (e.g., a virtual machine (VM)) running on the ARM®-based interface card to access the host server's memory: (i) using direct mapping, where load or store accesses are translated to the PCI Express transactions by the hardware associated with the system, or (ii) using swapping, where access to the unmapped pages cause hardware exceptions, which are handled by the hypervisor.

In certain examples, the methods and systems described herein may be deployed in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Figure 2:
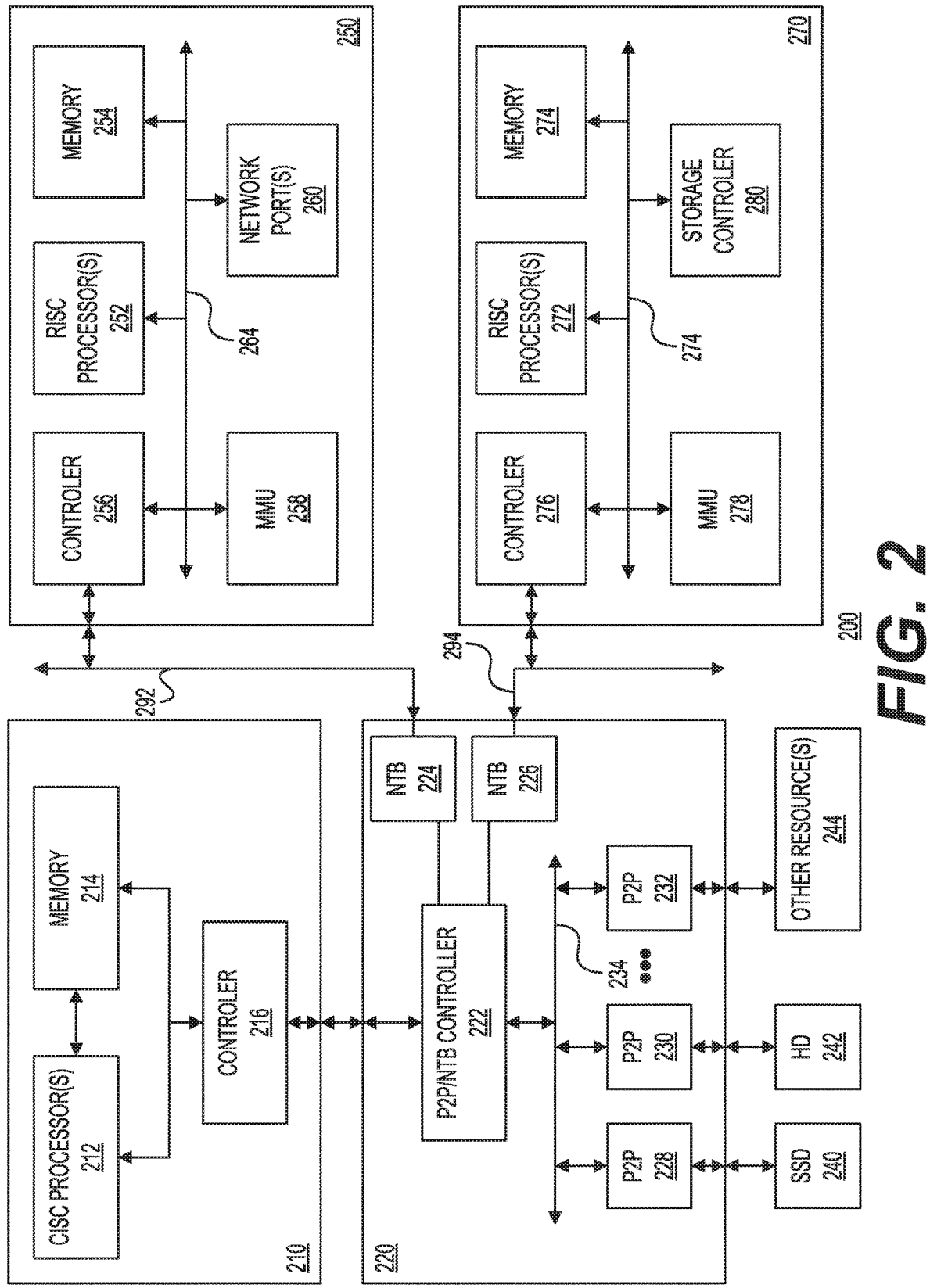
FIG. 2 shows another system for harvesting unused resources in accordance with one example.

FIG. 2 shows a system 200 for harvesting unused resources in accordance with one example. System 200 may be configured to allow the harvesting of resources using direct mapping. System 200 may include a host server 210 coupled to a PCI Express bridge 220 that supports non-transparent bridge (NTB) functionality. The NTB bridge functionality may be used to allow system 200 to operate in the direct access mode. PCI Express bridge 220 may be coupled via PCI Express bus 292 to a network interface card 250. PCI Express bridge 220 may further be coupled via PCI Express bus 294 to a storage interface card 270. Host server 210 may include CISC processor(s) 212, memory 214, and a controller 216. PCI Express bridge 220 may include a peer-2-peer (P2P/NTB) controller 222, NTB port 224, NTB port 226, P2P port 228, P2P port 230, and P2P port 232, interconnected via bus system 234. Network interface card 250 may include RISC processor(s) 252, memory 254, controller 256, MMU 258, and network port(s) 260, interconnected via bus system 264. Storage interface card 270 may include RISC processor(s) 272, memory 274, controller 276, MMU 278, and storage controller 280, interconnected via bus system 274.

With continued reference to FIG. 2, in this example, busses 292 and 294 may correspond to PCI Express busses capable of functioning in accordance with the PCI Express specification, including with support for non-transparent bridging. The transactions may be routed using address routing, ID-based routing (e.g., using bus, device, and function numbers), or implicit routing using messages. The transaction types may include transactions associated with memory read/write, I/O read/write, configuration read/write, and messaging operations. The endpoints of the PCI Express system may be configured using base address registers (BARs). The type of BAR may be configured as a BAR for memory operations or I/O operations. Other set up and configuration may also be performed, as needed. The hardware associated with PCI Express system (e.g., the root complexes, NTB ports, P2P ports) may further provide functionality to enable the performance of the memory read/write operations and I/O operations. As an example, address translation logic associated with the PCI Express system may be used for address translation for packet processing, including packet forwarding or packet dropping. In certain examples, busses 292 and 294 may further support InfiniBand® (or similar functionality) over the PCI Express bus system. This may allow the offloading of the transport layer and other layers needed for communication via busses 292 and 294 into hardware, such as integrated circuits. Busses 292 and 294 may further support RDMA over Converged Ethernet (RoCE) to allow RDMA operations over the Ethernet network.

Still referring to FIG. 2, using PCI Express transactions, system 200 may allow memory or I/O accesses via PCI Express systems. In this example, a hypervisor executing on host server 210 may map a memory region associated with memory 214 into the guest address space of a virtual machine executing on RISC processor(s) 252 or 272. When a loading of data is needed by the VM, the load is directly translated by MMU 258 and controller 256 (or by MMU 278 and controller 276) into a PCI Express transaction. The PCI Express transactions concerning load from a memory (e.g., a DRAM) may include NTB port 224 (or NTB port 226) receiving the PCI Express packets and forwarding them via P2P/NTB controller 222 to controller 216 for accessing data stored in memory 214, which is associated with host server 210.

With continued reference to FIG. 2, in one example, controller 216 may implement bound checking to ensure that the access to memory 214 is secure. Thus, controller 216 may check to see whether the virtual address is accessible to the specific type of incoming packet. Each region of memory 214 that may be harvested may have a key (e.g., rkey) associated with it. The rkey may not to be passed as part of the incoming packet. Controller 216 (associated with CISC processor(s) 212) may receive the key, and then look up a table to determine if the key matches. The matching of the key and the bound check may be required before granting access to the unused memory associated with CISC processor(s) 212.

Similarly, the PCI Express transaction concerning I/O access (e.g., access to SSD 240, HD 242, or other resource(s) 244) may include NTB port 224 (or NTB port 226) receiving the PCI Express packets and forwarding them via P2P/NTB controller 222 to a P2P controller (e.g., any of P2P controllers 228, 230, or 232) for accessing data stored in an I/O device (e.g., an SSD, an HD, or other I/O devices), which is associated with host server 210. The forwarding may also include address translation by the PCI Express system.

With continued reference to FIG. 2, when the storing of data is needed as part of the VM, the store may be directly translated by MMU 258 and controller 256 (or by MMU 278 and controller 276) into a PCI Express transaction. The PCI Express transactions concerning store to a memory (e.g., a DRAM) may include NTB port 224 (or NTB port 226) receiving the PCI Express packets and forwarding them via P2P/NTB controller 222 to controller 216 for storing data in memory 214, which is associated with host server 210. Similarly, the PCI Express transaction concerning I/O access (e.g., access to SSD 240, HD 242, or other resource(s) 244) may include NTB port 224 (or NTB port 226) receiving the PCI Express packets and forwarding them via P2P/NTB controller 222 to a P2P controller (e.g., any of P2P controllers 228, 230, or 232) for storing data in an I/O device (e.g., an SSD, an HD, or other I/O devices), which is associated with host server 210. Although FIG. 2 shows system 200 as including a certain number of components arranged and coupled in a certain way, it may include fewer or additional components arranged and coupled differently. In addition, the functionality associated with system 200 may be distributed or combined, as needed. As an example, although FIG. 2 shows NIB ports and P2P ports to enable the performance of the memory read/write operations and I/O operations, other types of interconnects may also be used to enable such functionality. Moreover, although FIG. 2 describes the access to the unused resources by VMs, other types of compute entities, such as containers, micro-VMs, microservices, unikernels for serverless functions, may access the unused resources associated with the host server in a like manner.

Figure 3:
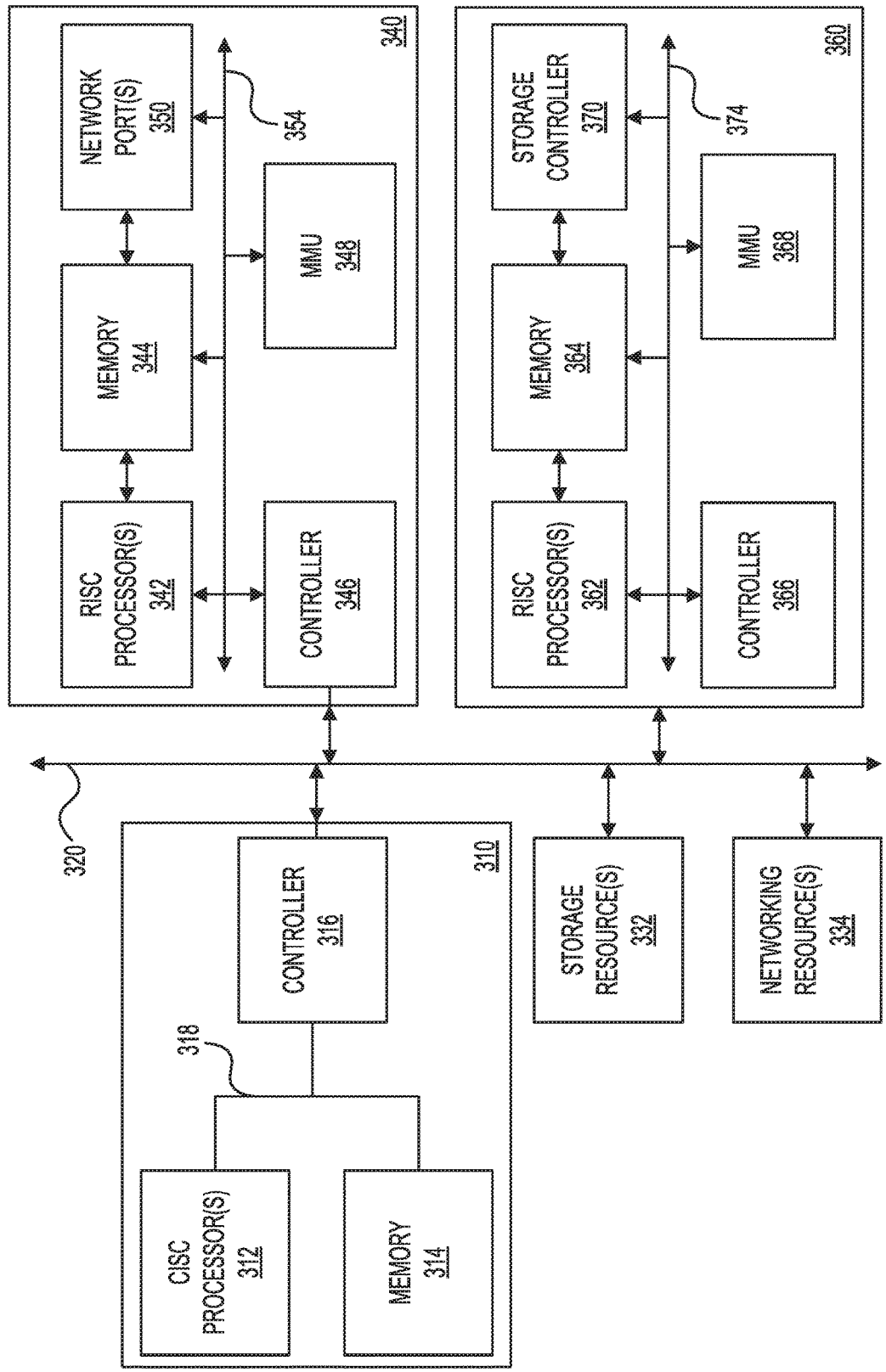
FIG. 3 shows another system for harvesting unused resources in accordance with one example.

FIG. 3 shows another system 300 for harvesting unused resources in accordance with one example. System 300 may be configured to allow the harvesting of resources using swapping of pages. In one example, system 300 may include a host server 310 coupled via a PCI Express bus system 320 to a network interface card 340 and a storage interface card 360. Host server 310 may include CISC processor(s) 312, memory 314, and a controller 316. Network interface card 340 may include RISC processor(s) 342, memory 344, controller 346, MMU 348, and network port(s) 350, interconnected via bus system 354. Storage interface card 360 may include RISC processor(s) 362, memory 364, controller 366, MMU 368, and storage controller 370, interconnected via bus system 374.

With continued reference to FIG. 3, in this example system, any load/store operations associated with the virtual machines being executed by RISC processor(s) 342 or 362 may be enabled using Remote Direct Memory Access (RDMA) operations between a memory (or an I/O device) associated with host server 310 and the RISC processors. In one example, the transfer of any data from the memory associated with host server 310 to the virtual machine being executed by RISC processor(s) 342 or 362 may be accomplished by an operation performed via PCI Express bus system 320. In certain examples, bus 320 may further support InfiniBand® (or similar functionality) over the PCI Express bus system. This may allow the offloading of the transport layer and other layers needed for communication via busses 292 and 294 into hardware, such as integrated circuits. Busses 292 and 294 may further support RDMA over Converged Ethernet (RoCE) to allow RDMA operations over the Ethernet network.

In this example, prior to any such memory operations (or I/O operations) being performed, control information may be exchanged between host server 310 and an interface card (e.g., any of interface cards 340 and 360). The exchange of information may occur between hypervisors (e.g., the hypervisors shown in FIG. 1). Some of the control information may relate to host server 310 designating memory space that could be accessed by a virtual machine being executed using the RISC processors (e.g., an ARM®-core based system-on-chip (SoC) included as part of an interface card). In addition, the memory management unit (or similar functionality) associated with the interface card may be allowed to access host-side page tables or other memory map tables. Access to unmapped pages may cause hardware exceptions, such as page faults. The hypervisor may access host memory and install page table mappings, after moving the remote page to the local memory associated with the interface card(s).

In one example, memory 344 or memory 364 may act as a cache for the compute entities being executed using the processors associated with the interface cards. Assuming the compute entity requests access to a page that is mapped, then that may be viewed as a cache hit and the content of the page may be accessed by the compute entity. On the other hand, if the page is not mapped, then it may be viewed as a cache miss. In this scenario, a page may first be evicted from memory 344 or 364. This process may include a store of the evicted page to memory 314. The page that is being accessed may then be provided by host server 310 to the requesting compute entity as long as it passes other requirements discussed earlier.

Still referring to FIG. 3, as noted earlier, as part of system 300, loads and stores may be performed using RDMA. RDMA may allow copying of the data directly from the memory of one system (e.g., host server 310) into that of another (e.g., any of the interface cards) without any involvement of either system's operating system. This way, interface cards that support RDMA may achieve the zero-copy benefit by transferring data directly to, or from, the memory space of processes, which may eliminate the extra data copy between the application memory and the data buffers in the operating system. In other words, in this example, by using address translation/mapping across the various software/hardware layers, only one copy of the data may be stored in a memory (or an I/O device) associated with the host server.

With continued reference to FIG. 3, in one example, the hypervisor associated with host server 310 may allocate certain memory space in memory 314 for use by virtual machines executing using the RISC processor(s) 342 or RISC processor(s) 362. MMU 348 (or MMU 368) may perform address translation between the virtual address space associated with the virtual machines executing using the RISC processor(s) 342 or RISC processor(s) 362 and memory space in memory 314. As noted earlier, the hypervisor associated with host server 310 may designate memory space in memory 314 in a manner that certain memory space is not accessible to any of the virtual machines being executed using RISC processor(s) 342 or RISC processor(s) 362. Similarly, using RDMA, virtual machines being executed by RISC processor(s) 342 or RISC processor(s) 362 may access other I/O devices associated with the host server, including storage resources(s) 332 and networking resource(s) 334. Although FIG. 3 shows system 300 as including a certain number of components arranged and coupled in a certain way, it may include fewer or additional components arranged and coupled differently. In addition, the functionality associated with system 300 may be distributed or combined, as needed. Also, in addition to memory, disk, and network resources, it may be possible to harvest cooling (no active fan) and the unused power of the host server (e.g. host server 310). Moreover, although FIG. 3 describes the access to the unused resources by VMs, other types of compute entities, such as containers, micro-VMs, microservices, unikernels for serverless functions, may access the unused resources associated with the host server in a like manner.

Figure 4:
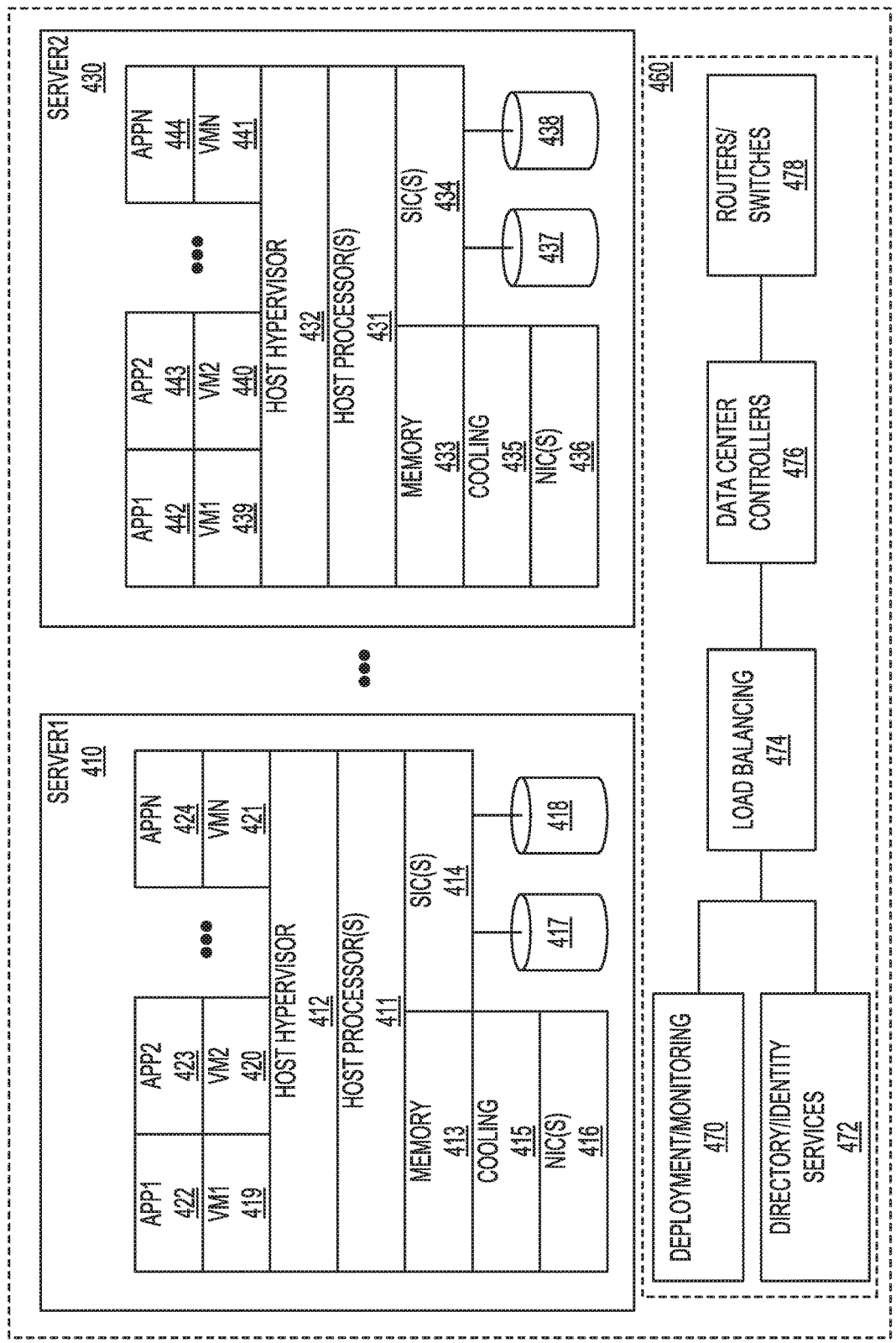
FIG. 4 shows a system environment for implementing a system for harvesting unused resources in accordance with one example.

The harvesting of the unused resources associated with any of the host servers may be offered via systems deployed in a data center or other such computing facilities. FIG. 4 shows a system environment 400 for harvesting unused resources in accordance with one example. In this example, system environment 400 may correspond to a portion of a data center. As an example, the data center may include several clusters of racks including platform hardware, such as server nodes, storage nodes, networking nodes, or other types of nodes. Server nodes may be connected to switches to form a network. The network may enable connections between each possible combination of switches. System environment 400 may include server1 410 and server2 430. System environment 400 may further include data center related functionality 460, including deployment/monitoring 470, directory/identity services 472, load balancing 474, data center controllers 476 (e.g., software defined networking (SDN) controllers and other controllers), and routers/switches 478. Server1 410 may include host processor(s) 411, host hypervisor 412, memory 413, storage interface controller(s) (SIC(s)) 414, cooling 415, network interface controller(s) (NIC(s)) 416, and storage disks 417 and 418. Server2 430 may include host processor(s) 431, host hypervisor 432, memory 433, storage interface controller(s) (SIC(s)) 434, cooling 435, network interface controller(s) (NIC(s)) 436, and storage disks 437 and 438. Server1 410 may be configured to support virtual machines, including VM1 419, VM2 420, and VMN 421. The virtual machines may further be configured to support applications, such as APP1 422, APP2 423, and APPN 424. Server2 430 may be configured to support virtual machines, including VM1 439, VM2 440, and VMN 441. The virtual machines may further be configured to support applications, such as APP1 442, APP2 443, and APPN 444.

With continued reference to FIG. 4, in one example, system environment 400 may be enabled for multiple tenants using the Virtual eXtensible Local Area Network (VXLAN) framework. Each virtual machine (VM) may be allowed to communicate with VMs in the same VXLAN segment Each VXLAN segment may be identified by a VXLAN Network Identifier (VNI). Although FIG. 4 shows system environment 400 as including a certain number of components arranged and coupled in a certain way, it may include fewer or additional components arranged and coupled differently. In addition, the functionality associated with system environment 400 may be distributed or combined, as needed. Moreover, although FIG. 4 describes the access to the unused resources by VMs, other types of compute entities, such as containers, micro-VMs, microservices, unikernels for serverless functions, may access the unused resources associated with the host server in a like manner.

Figure 5:
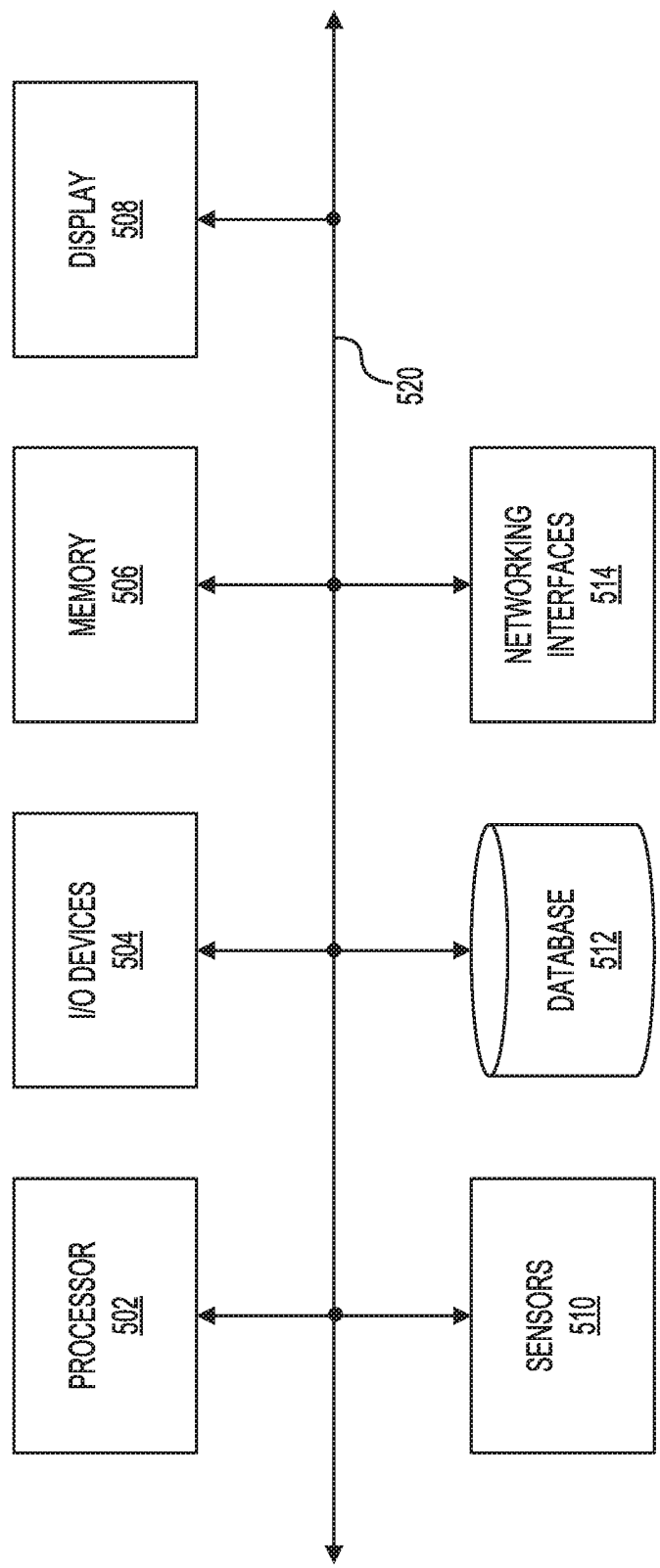
FIG. 5 shows a computing platform that may be used for configuring certain aspects of the system environment of FIG. 4 in accordance with one example.

FIG. 5 shows a block diagram of a computing platform 500 (e.g., for implementing certain aspects of harvesting of the unused resources) in accordance with one example. Computing platform 500 may include a processor 502, I/O devices 504, memory 506, display 508, sensors 510, database 512, and networking interfaces 514, which may be interconnected via bus 520. Processor 502 may execute instructions stored in memory 506. I/O devices 504 may include components such as a keyboard, a mouse, a voice recognition processor, or touch screens. Memory 506 may be any combination of non-volatile storage or volatile storage (e.g., flash memory, DRAM, SRAM, or other types of memories). Display 508 may be any type of display, such as LCD, LED, or other types of display. Sensors 510 may include telemetry or other types of sensors configured to detect, and/or receive, information (e.g., conditions associated with the devices). Sensors 510 may include sensors configured to sense conditions associated with CPUs, memory or other storage components, FPGAs, motherboards, baseboard management controllers, or the like. Sensors 510 may also include sensors configured to sense conditions associated with racks, chassis, fans, power supply units (PSUs), or the like. Sensors 510 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

With continued reference to FIG. 5, sensors 510 may be implemented in hardware, software, or a combination of hardware and software. Some sensors 510 may be implemented using a sensor API that may allow sensors 510 to receive information via the sensor API. Software configured to detect or listen to certain conditions or events may communicate via the sensor API any conditions associated with devices that are part of the harvesting of resources in a data center or another like systems. Remote sensors or other telemetry devices may be incorporated within the data centers to sense conditions associated with the components installed therein. Remote sensors or other telemetry may also be used to monitor other adverse signals in the data center. As an example, if fans that are cooling a rack stop working then that may be sensed by the sensors and reported to the deployment and monitoring functions. This type of monitoring may ensure that any impact on the harvesting of resources is detected, recorded, and corrected, as needed.

Still referring to FIG. 5, database 512 may be used to store records related to the harvesting of unused resources, including policy records establishing which resources may be used or not used. The policy records may also be used to establish fairness-based policies to allow the harvesting of the resources in a manner that the tenants of the host servers are not unfairly impacted. In addition, database 512 may also store data used for generating reports related to the harvesting of the resources.

Figure 6:
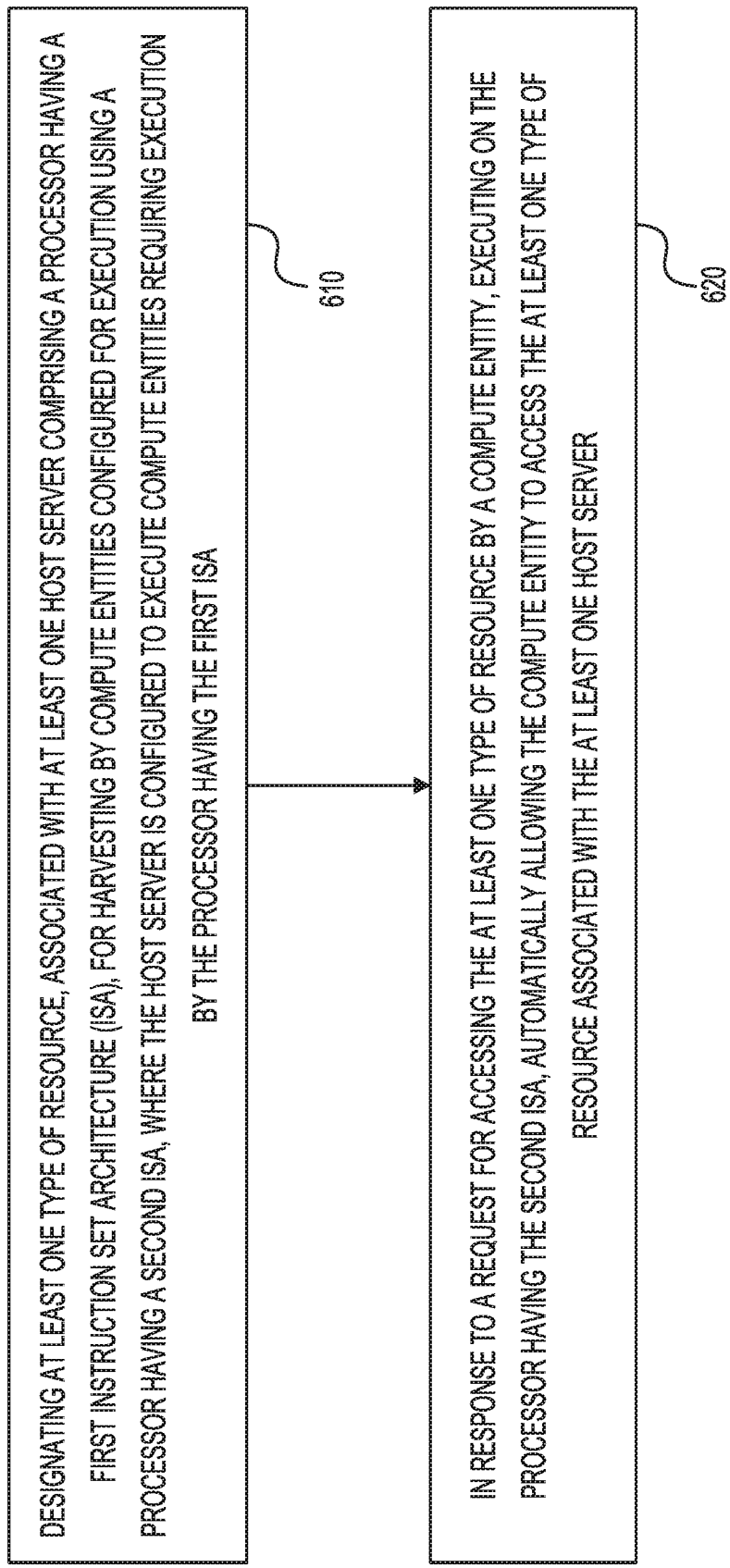
FIG. 6 shows a flowchart of a method for the harvesting of resources in accordance with one example.

Network interfaces 514 may include communication interfaces, such as Ethernet, cellular radio, Bluetooth radio, UWB radio, or other types of wireless or wired communication interfaces. Although FIG. 5 shows computing platform 500 as including a certain number of components arranged and coupled in a certain way, it may include fewer or additional components arranged and coupled differently. In addition, the functionality associated with computing platform 500 may be distributed, as needed. Moreover, although FIG. 5 describes the access to the unused resources by VMs, other types of compute entities, such as containers, micro-VMs, microservices, unikernels for serverless functions, may access the unused resources associated with the host server in a like manner FIG. 6 shows a flowchart 600 of a method in accordance with one example. In this example, this method may be performed in a system including at least one host server and at least one interface card configured to interface with a network or a storage, where the at least one host server comprises a processor having a first instruction set architecture (ISA) (e.g., an x86-based processor) and the at least one interface card comprises a processor having a second ISA (e.g., an ARM®-based processor), different from the first ISA. As an example, this method may be performed in system environment 400 of FIG. 4 using system 200 of FIG. 2 or system 300 of FIG. 3. Step 610 may include designating at least one type of resource, associated with the at least one host server, for harvesting by compute entities configured for execution using the processor having the second ISA. As an example, using system 200 of FIG. 2, or system 300 of FIG. 3, memory or I/O devices may be designated as the type of resources that could be harvested by compute entities being executed by the processor having the second ISA (e.g., an ARM®-based processor).

Step 620 may include in response to a request for accessing the at least one type of resource by a compute entity, executing on the processor having the second ISA, automatically allowing the compute entity to access the at least one type of resource associated with the at least one host server. As an example, using system 200 of FIG. 2, or system 300 of FIG. 3, the memory or I/O devices may be designated as the type of resources that could be harvested by compute entities being executed by the processor having the second ISA. Although FIG. 6 describes flow chart 600 as including a certain number of steps being executed in a certain order, the method of harvesting resources may include additional steps executed in a different order.

Figure 7:
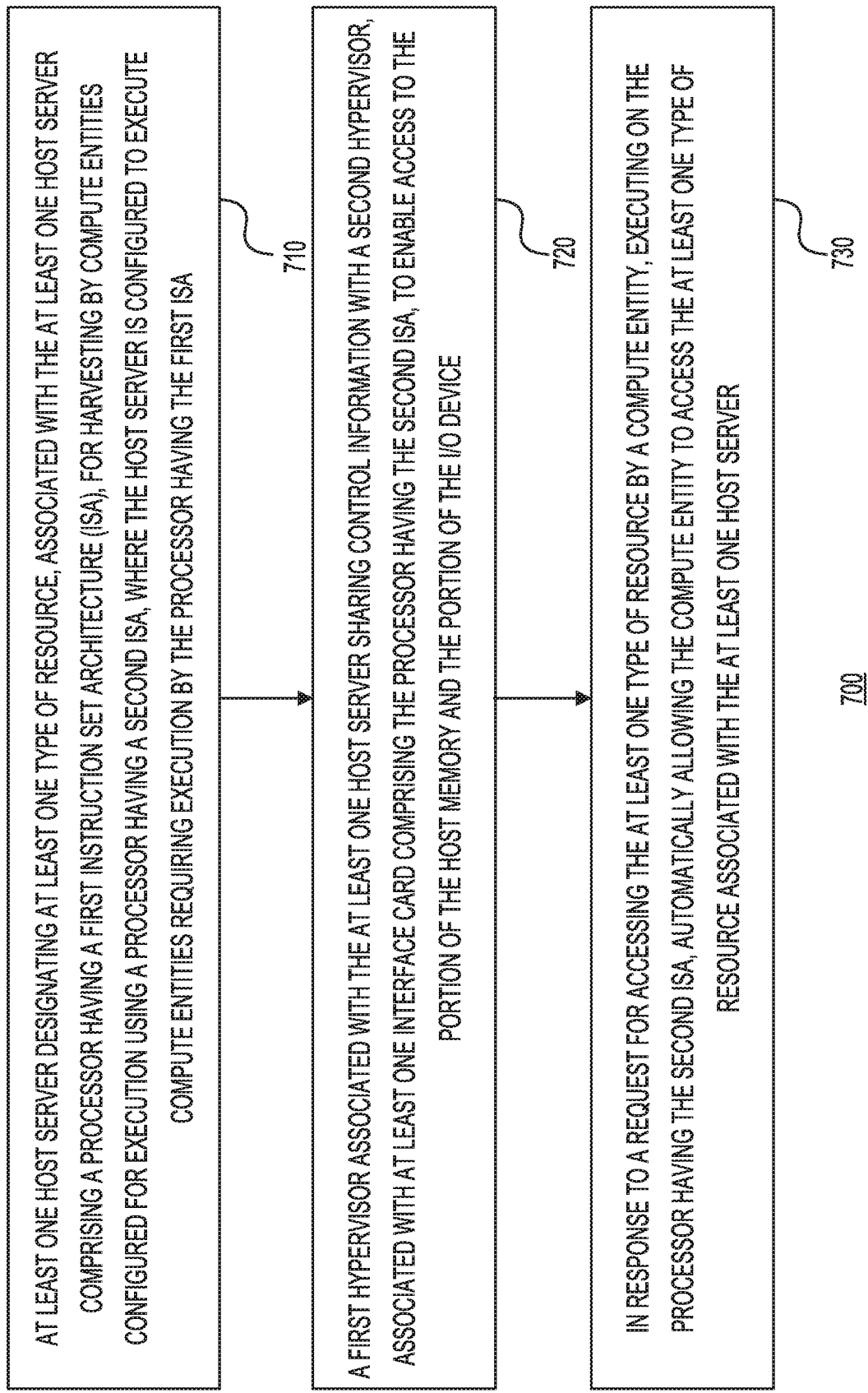
FIG. 7 shows another flowchart of a method for the harvesting of resources in accordance with one example.

FIG. 7 shows another flowchart 700 of a method in accordance with one example. In this example, this method may be performed in a system including at least one host server and at least one interface card configured to interface with a network or a storage, where the at least one host server comprises a processor having a first instruction set architecture (ISA) (e.g., an x86-based processor) and the at least one interface card comprises a processor having a second ISA (e.g., an ARM®-based processor), different from the first ISA. As an example, this method may be performed in system environment 400 of FIG. 4 using system 200 of FIG. 2 or system 300 of FIG. 3. Step 710 may include the at least one host server designating at least one type of resource, associated with the at least one host server for harvesting by compute entities configured for execution using the processor having the second ISA, where the host server is configured to execute virtual machines requiring execution by the processor having the first ISA. As an example, using system 200 of FIG. 2, or system 300 of FIG. 3, the at least one host server may designate memory or I/O devices as the type of resources that could be harvested by compute entities being executed by the processor having the second ISA (e.g., an ARM®-based processor).

Step 720 may include a first hypervisor associated with the at least one host server sharing control information with a second hypervisor associated with the at least one interface card to enable access to the portion of the host memory and the portion of the I/O device. As an example, using system 100 of FIG. 1, system 200 of FIG. 2, or system 300 of FIG.

3, a first hypervisor (e.g., hypervisor 130) associated with the at least one host server (host server 110) may share control information with a second hypervisor (e.g., hypervisor 140) associated with the at least one interface card (e.g., interface card 120) to enable access to the portion of the host memory and the portion of the I/O device.

Step 730 may include in response to a request for accessing the at least one type of resource by a compute entity, executing on the processor having the second ISA, automatically allowing the compute entity to access the at least one type of resource associated with the at least one host server. As an example, using system 200 of FIG. 2, or system 300 of FIG. 3, the memory or I/O devices may be designated as the type of resources that could be harvested by compute entities being executed by the processor having the second ISA. Although FIG. 7 describes flow chart 700 as including a certain number of steps being executed in a certain order, the method of harvesting resources may include additional steps executed in a different order.

In conclusion, the present disclosure relates to a method in a system including at least one host server and at least one interface card configured to interface with a network or a storage, where the at least one host server comprises a processor having a first instruction set architecture (ISA) and the at least one interface card comprises a processor having a second ISA, different from the first ISA. The method may include designating at least one type of resource, associated with the at least one host server for harvesting by compute entities configured for execution using the processor having the second ISA, where the host server is configured to execute compute entities requiring execution by the processor having the first ISA. The method may further include in response to a request for accessing the at least one type of resource by a compute entity, executing on the processor having the second ISA, automatically allowing the compute entity to access the at least one type of resource associated with the at least one host server.

The first ISA may comprise a complex instruction set computer (CISC) instruction set architecture. The second ISA may comprise a reduced instruction set computer (RISC) instruction set architecture.

The at least one resource designated by the host server for harvesting by the virtual machines configured for execution using the processor having the second ISA may comprise a volatile memory or a non-volatile memory. The at least one resource designated by the host server for harvesting by the virtual machines configured for execution using the processor having the second ISA may comprise an input/output device.

The compute entity may include at least one of a virtual machine (VM), a micro-VM, a microservice, or a unikernel for serverless functions. The accessing the at least one type of resource by the compute entity may comprise performing address translation.

In another aspect, the present disclosure relates to a method in a system including at least one host server and at least one interface card configured to interface with a network or a storage, where the at least one host server comprises a processor having a first instruction set architecture (ISA) and the at least one interface card comprises a processor having a second ISA, different from the first ISA. The method may include the at least one host server designating at least one type of resource, associated with the at least one host server for harvesting by compute entities configured for execution using the processor having the second ISA, where the host server is configured to execute virtual machines requiring execution by the processor having the first ISA. The at least one type of resource includes at least one of a host memory and an input/output (I/O) device. The method may further include a first hypervisor associated with the at least one host server sharing control information with a second hypervisor associated with the at least one interface card to enable access to the portion of the host memory and the portion of the I/O device. The method may further include in response to a request for accessing the at least one type of resource by a compute entity, executing on the processor having the second ISA, automatically allowing the compute entity to access the at least one type of resource associated with the at least one host server.

The first ISA may comprise a complex instruction set computer (CISC) instruction set architecture. The second ISA may comprise a reduced instruction set computer (RISC) instruction set architecture.

The host memory may comprise a volatile memory or a non-volatile memory. The I/O device may comprise a storage device or a networking device.

The compute entity may include at least one of a virtual machine (VM), a micro-VM, a microservice, or a unikernel for serverless functions. The accessing the at least one type of resource by the compute entity may comprise performing address translation. The control information may include information concerning mapping of memory pages associated with the at least one host server.

In yet another aspect, the present disclosure relates to a distributed computing system including a host server comprising a processor having a first instruction set architecture (ISA), where the host server is configured to service compute entities corresponding to at least one tenant, and where each of the compute entities is required to execute using the processor having the second ISA. The distributed computing system may further include an interface card, coupled to the host server, comprising a processor having a second ISA. The distributed computing system may further include a system configured to: (1) allow designation of at least one type of resource, associated with the host server for harvesting by compute entities configured for execution using the processor having the second ISA, (2) allow sharing of control information between a first hypervisor associated with the host server and a second hypervisor with the interface card, and (3) in response to a request for accessing the at least one type of resource by a compute entity, executing on the processor having the second ISA, automatically allow the compute entity to access the at least one type of resource associated with the at least one host server.

The first ISA may comprise a complex instruction set computer (CISC) instruction set architecture and the second ISA may comprise a reduced instruction set computer (RISC) instruction set architecture. The at least one resource designated by the host server for harvesting by the virtual machines configured for execution using the processor having the second ISA may comprise a volatile memory, a non-volatile memory, or an input/output device.

The compute entity may comprise at least one of a virtual machine (VM), a micro-VM, a microservice, or a unikernel for serverless functions. The control information may include information concerning mapping of memory pages associated with the at least one host server.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a system including at least one host server and at least one interface card configured to interface with a network or a storage, wherein the at least one host server comprises a processor having a first instruction set architecture (ISA) and the at least one interface card comprises a processor having a second ISA; the method comprising:

designating at least one type of resource, associated with the at least one host server for harvesting by compute entities configured for execution using the processor having the second ISA, wherein the at least one host server is configured to execute compute entities requiring execution by the processor having the first ISA; and in response to a request for accessing the at least one type of resource by a compute entity, executing on the processor having the second ISA, automatically allowing the compute entity to access the at least one type of resource associated with the at least one host server.

2. The method of claim 1, wherein the first ISA comprises a complex instruction set computer (CISC) instruction set architecture.

3. The method of claim 2, wherein the second ISA comprises a reduced instruction set computer (RISC) instruction set architecture.

4. The method of claim 1, wherein the at least one resource designated by the host server for harvesting by the compute entities configured for execution using the processor having the second ISA comprises a volatile memory or a non-volatile memory.

5. The method of claim 1, wherein the at least one resource designated by the host server for harvesting by the compute entities configured for execution using the processor having the second ISA comprises an input/output device.

6. The method of claim 1, wherein the compute entity comprises at least one of a virtual machine (VM), a micro-VM, a microservice, or a unikernel for serverless functions.

7. The method of claim 1, wherein the accessing the at least one type of resource by the compute entity comprises performing address translation.

8. A method in a system including at least one host server and at least one interface card configured to interface with a network or a storage, wherein the at least one host server comprises a processor having a first instruction set architecture (ISA) and the at least one interface card comprises a processor having a second ISA, the method comprising:

the at least one host server designating at least one type of resource, associated with the at least one host server for harvesting by compute entities configured for execution using the processor having the second ISA, wherein the host server is configured to execute virtual machines requiring execution by the processor having the first ISA, and wherein the at least one type of resource includes at least one of a host memory and an input/output (I/O) device;

a first hypervisor associated with the at least one host server sharing control information with a second hypervisor associated with the at least one interface card to enable access to a portion of the host memory and a portion of the I/O device; and in response to a request for accessing the at least one type of resource by a compute entity, executing on the processor having the second ISA, automatically allowing the compute entity to access the at least one type of resource associated with the at least one host server.

9. The method of claim 8, wherein the first ISA comprises a complex instruction set computer (CISC) instruction set architecture.

10. The method of claim 8, wherein the second ISA comprises a reduced instruction set computer (RISC) instruction set architecture.

11. The method of claim 8, wherein the host memory comprises a volatile memory or a non-volatile memory.

12. The method of claim 8, wherein the I/O device comprises a storage device or a networking device.

13. The method of claim 8, wherein the compute entity comprises at least one of a virtual machine (VM), a micro-VM, a microservice, or a unikernel for serverless functions.

14. The method of claim 8, wherein the accessing the at least one type of resource by the compute entity comprises performing address translation.

15. The method of claim 8, wherein the control information comprises information concerning mapping of memory pages associated with the at least one host server.

16. A distributed computing system comprising:
a host server comprising a processor having a first instruction set architecture (ISA), wherein the host server is configured to service compute entities corresponding to at least one tenant, and wherein each of the compute entities is required to execute using the processor having the first ISA;
an interlace card, coupled to the host server, comprising a processor having a second ISA; and
a system configured to:
allow designation of at least one type of resource, associated with the host server for harvesting by compute entities configured for execution using the processor having the second ISA,
allow sharing of control information between a first hypervisor associated with the host sever and a second hypervisor with the interlace card, and
in response to a request for accessing the at least one type of resource by a compute entity, executing on the processor having the second ISA, automatically allow the compute entity to access the at least one type of resource associated with the at least one host server.

17. The distributed computing system of claim 16, wherein the first ISA comprises a complex instruction set computer (CISC) instruction set architecture and wherein the second ISA comprises a reduced instruction set computer (RISC) instruction set architecture.

18. The distributed computing system of claim 17, wherein the at least one resource designated by the host server for harvesting by the virtual machines configured for execution using the processor having the second ISA comprises a volatile memory, a non-volatile memory, or an input/output device.

19. The distributed computing system of claim 18, wherein the compute entity comprises at least one of a virtual machine (VM), a micro-VM, a microservice, or a unikernel for serverless functions.

20. The distributed computing system of claim 19, wherein the control information includes information concerning mapping of memory pages associated with the at least one host server.

* * * * *